(12) United States Patent
Laik

(10) Patent No.: US 11,170,054 B2
(45) Date of Patent: Nov. 9, 2021

(54) CONTACT GENERATION DEVICE

(71) Applicant: Philippe Charles Laik, Monte Carlo (MC)

(72) Inventor: Philippe Charles Laik, Monte Carlo (MC)

(*) Notice: Subject to any disclaimer, the term of this patent is extended or adjusted under 35 U.S.C. 154(b) by 0 days.

(21) Appl. No.: 16/086,519

(22) PCT Filed: Sep. 14, 2018

(86) PCT No.: PCT/IB2018/057060
§ 371 (c)(1),
(2) Date: Sep. 19, 2018

(87) PCT Pub. No.: WO2020/053630
PCT Pub. Date: Mar. 19, 2020

(65) Prior Publication Data
US 2021/0216592 A1    Jul. 15, 2021

(51) Int. Cl.
*G06F 16/00* (2019.01)
*G06F 16/9035* (2019.01)
*G06F 16/28* (2019.01)
*G06F 16/335* (2019.01)

(52) U.S. Cl.
CPC ........ *G06F 16/9035* (2019.01); *G06F 16/284* (2019.01); *G06F 16/335* (2019.01)

(58) Field of Classification Search
CPC .................................................... G06F 16/335
See application file for complete search history.

(56) References Cited

U.S. PATENT DOCUMENTS

| 2009/0157513 A1* | 6/2009 | Bonev | G06Q 30/02 |
| | | | 705/14.69 |
| 2009/0313299 A1* | 12/2009 | Bonev | G06F 3/0481 |
| 2012/0143969 A1 | 6/2012 | Shenoy | |
| 2013/0254233 A1 | 9/2013 | Fagundes et al. | |
| 2015/0302098 A1* | 10/2015 | Hern | G06F 21/41 |
| | | | 707/708 |

FOREIGN PATENT DOCUMENTS

EP          2450842 A    5/2012

OTHER PUBLICATIONS

PCT Search Report.
PCT Written Opinion.

* cited by examiner

*Primary Examiner* — Ajith Jacob
(74) *Attorney, Agent, or Firm* — J D Harriman; Foundation Law Group LLP

(57) ABSTRACT

Techniques for generating a list of selective contacts are described. An address book of the user may be stored on a relational database to free up the memory space occupied by the address book. Further, selection parameters for evaluation of the plurality of contacts are determined. A plurality of contacts is filtered, based on the determined selection parameters, to generate a first set of selective contacts. Thereafter, dynamic filtering parameters are identified and based on the dynamic filtering parameters, the first set of selective contacts are filtered to generate a second set of selective contacts, wherein the second set of selective contacts are stored in the memory space of the device, and wherein the second set of selective contacts are available to the user for utilization for a predetermined time period.

17 Claims, 6 Drawing Sheets

CONTACT GENERATION DEVICE

BACKGROUND

Computing devices, such as a mobile device, a pager, may have a list of contacts stored in their memory storage. The list of contacts may contain contact information, such as the mobile number, emails of other users. To contact another user, the user of the computing device accesses the list of contact and establishes a contact with the other user via their contact information.

SUMMARY

Techniques for generating a list of selective contacts are described. An address book of the user may be stored on a relational database to free up the memory space occupied by the address book. Further, selection parameters for evaluation of the plurality of contacts are determined. A plurality of contacts is filtered, based on the determined selection parameters, to generate a first set of selective contacts. Thereafter, dynamic filtering parameters are identified and based on the dynamic filtering parameters, the first set of selective contacts are filtered to generate a second set of selective contacts, wherein the second set of selective contacts are stored in the memory space of the device, and wherein the second set of selective contacts are available to the user for utilization for a predetermined time period.

BRIEF DESCRIPTION OF FIGURES

The following detailed description references the drawings, wherein.

DETAILED DESCRIPTION

Figure 1:
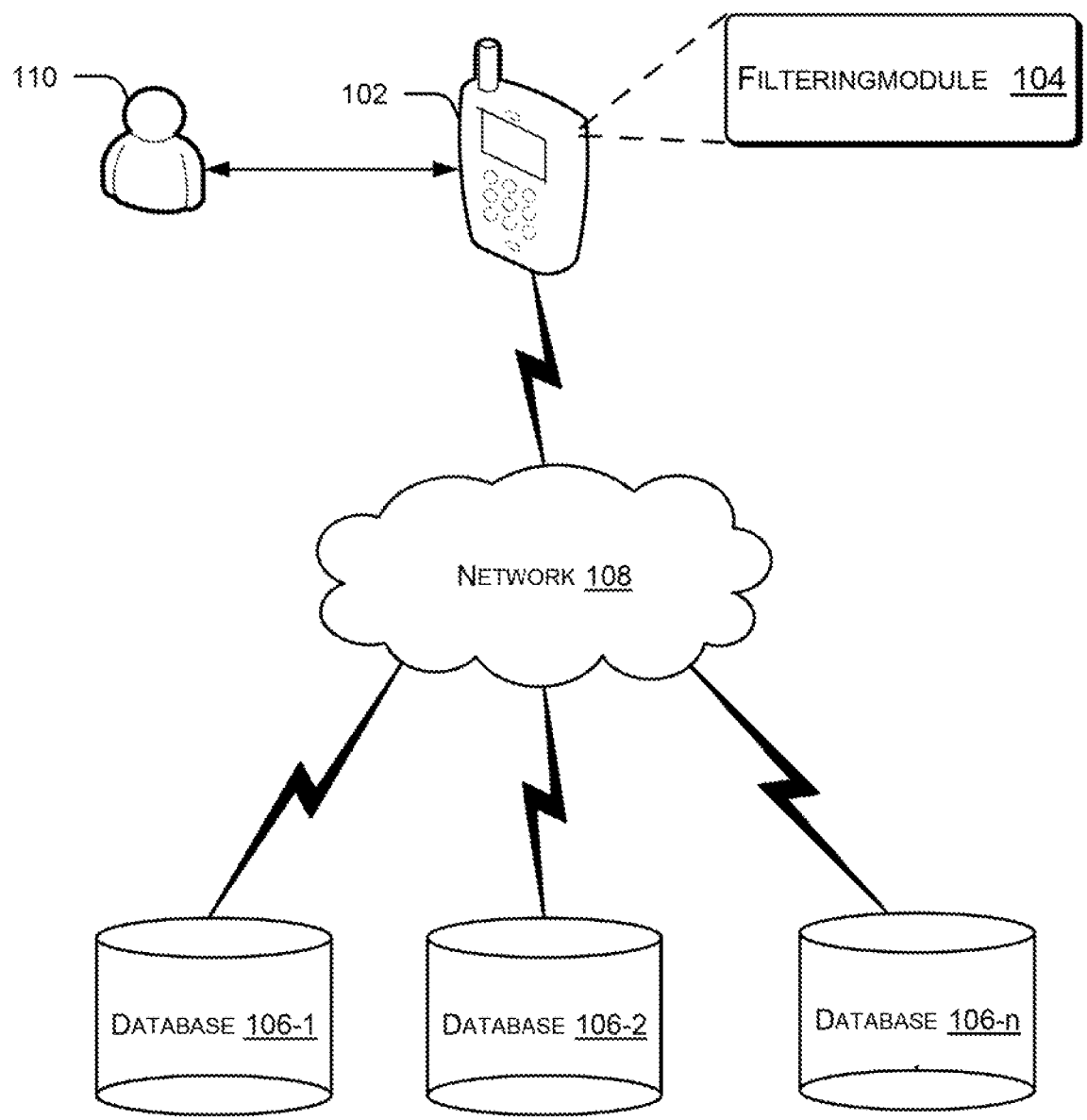
FIG. 1 illustrates a network environment implementing a contact generation device, in accordance with an example implementation of the present subject matter.

The description of the present subject matter herein incorporates the specification and drawings of the US granted patent U.S. Pat. No. 6,980,870, by reference in its entirety. The U.S. Pat. No. 6,980,870 discloses techniques for managing, optimizing, and scheduling personal relationship with a contact.

Computing devices like mobile phones, laptops, personal computers, etc., have address books to facilitate users to store contact details of peoples, such as like colleagues, friends, relatives, family, doctors, service centers, restaurants, etc. The details of a contact may include mobile numbers, address, email address, landline numbers, fax number etc.

These details are stored in the address book of a device which consumes the storage spaces of the computing device. With increase in number of contacts the performance of a device may become sluggish as the storage space consumed by the address book will increase.

The contacts are usually stored by the devices in alphabetical order, but with increase in number of contacts it gets cumbersome for a user to search for a desirable contact from the address book when there is plurality of contacts stored in the address book. The user may have to search for the desirable contact from the plurality of the contacts which will consume a lot of time of the users.

According to an aspect of the present subject matter, techniques for generating a list of selective contacts are described. In an example implementation of the present subject matter, an address book of the user may be stored on a relational database to free up the memory space occupied by the address book. Further, according to the present subject matter, selection parameters for evaluation of the plurality of contacts are determined, wherein the selection parameters are indicative of user preferences and system selection criterion. According to the present subject matter, a plurality of contacts is filtered, based on the determined selection parameters, to generate a first set of selective contacts. Thereafter, dynamic filtering parameters are identified wherein the dynamic filtering parameters are indicative of dynamic choices of the user. For example, the dynamic parameters may be a weightage provided to the selection parameters by the user, any priority based input by the user, any other specific details provided by the user. The dynamic parameters may be changed by the user at runtime. Based on the dynamic filtering parameters, the first set of selective contacts are filtered to generate a second set of selective contacts, wherein the second set of selective contacts are stored in the memory space of the device, and wherein the second set of selective contacts are available to the user for utilization for a predetermined time period.

Thus, according to the present subject matter, as the address book is stored on the relation database, the memory of a user's device is not consumed thus, preventing the user's device from being sluggish. When the address book is stored in a user's device, the address book occupies storage space in the memory of the user's device. Increasing storage causes sluggishness of the user's device. According to the present subject matter, the address book is stored in the database thus freeing up the memory of the user' device which results in faster response time of the user's device. The address book of the user is protected by optimal encryption technique. The address book is stored in encrypted form thus preventing any malicious user. All the calculation and processing happen at the database by backend servers. A plurality of micro software services allows parallel execution and processing of the data. The data is processed using graphical processor unit (GPU) processors at these databases which are significantly faster than the central processing units of the user's mobile device. Also, as the processing is done at backend servers, the battery power of the user's device is saved. The mobile phone and tablet are equipped with 99% ARM processors. The back end servers are equipped with x86 processors (Intel or advanced micro devices (AMD)) and GPU (Nvidia or AMD). According to the set of benchmarks, the ARM architecture is about 8 times less efficient than the x86 architecture when it comes to complex calculation.

Further, as the list of selective contacts is provided to the user, it is not cumbersome and time consuming for a user to retrieve a desired contact. Now, the contacts are generated and provided to the user and user need not to search the contact books for the contacts.

The above techniques are further described with reference to FIG. 1 to FIG. 6. It should be noted that the description and the Figures merely illustrate the principles of the present subject matter along with examples described herein and should not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 shows a contact generation device 102 implementing a filtering module 104, to generate a list of selective contacts, according to an example implementation of the present subject matter. The contact generation device 102 may be coupled with a plurality of databases, such as database 106-1, 106-2, . . . , 106-n, via a network 108.

The network 108 may be a single network or a combination of multiple networks and may use a variety of different communication protocols. The network 108 may be a wireless or a wired network, or a combination thereof. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN). Depending on the technology, the communication network 108 includes various network entities, such as gateways, routers; however, such details have been omitted for the sake of brevity of the present description.

The contact generation device 102 may be implemented as any of a variety of conventional computing devices, including, a mobile phone, a tablet, a pager, and a laptop. Further, the databases 106-1, 106-2, . . . , 106-n may be a hierarchical database, a network database, an object oriented database, a relational database etc.

According to an example implementation of the present subject matter, an address book comprising a plurality of contacts of a user, if stored in the contact generation device 102, is deleted from the contact generation device 102 and is transmitted and stored in a relational database, such as the database 106-1. The contact generation device 102 may access the databases 106-1, 106-2, . . . , 106-n to determine selection parameters for the plurality of contacts stored on the database 106-1.

In an example, the selection parameters are indicative of user preferences and system or device selection criterion. In other words, the selection parameters may include user selection parameters and system selection parameters. The user selection parameters are defined by a user of the contact generation device 102. The user selection parameters may include details, such as intensity of relation with a contact, schedule of the user including users' tours and travel plans, meeting schedule of the user, and appointments of the user. The system selection parameters are determined by the contact generation device 102. The system selection parameters may comprise details, such as frequency of calling a contact, category of the contact, time of the day, outside weather, location of the user.

In this manner, a user hoping to interact with one or more contacts from his contact list will only be provided with those contacts who are likely to be available for the desired interaction at that time. For example, if the interaction is talking, then the geographical location of the contact is not as critical, unless the contact is in a time zone where they would likely be sleeping or working. For interaction comprising personal meeting, the system would limit the contacts to those in close enough geographical location to be able to meet with the user.

In an example, the contact generation device 102 may access the databases 106-1, 106-2, . . . , 106-n to determine the user selection parameters and the system selection parameters. For example, for accessing a system selection parameter, such as weather of a day, the contact generation device 102 may access, via the network 108, a database, say database 106-2, to retrieve the information related to the weather.

Based on the selection parameters, the filtering module 104 may filter the plurality of contacts, stored in the relational database, to generate a first set of selective contacts. Each of the contacts may have a defined set of attributes, which may be defined by the user or by the contact generation device 102, in an example. The filtering module 104 may compare the selection parameters with the defined attributes to filter the plurality of contacts to generate a first set of selective contacts.

Further, the filtering module 104 may also generate recommendation for an activity for each of the contact. For example, a contact 'A' may be indicated to be interested in shopping, a contact 'B' may be indicated to be interested in movie and so on. In an example, the filtering module 104 may also sort the contacts based on the activity of the contacts. For example, if it is determined that the user is going for a shopping, the interaction generation module 214 may determine the contacts which are interested in shopping, based on their past or present activity on social media sites, geolocation etc., and may generate a list of contacts interested in shopping. The user may select an appropriate activity for a contact and may propose the contact for participating in the activity. For example, if a user is going to play tennis, the interaction generation module 214 may generate a list of contacts interested in tennis.

Further, in an example, the filtering module 104 may provide suggestion for a place of conducting the activity. For example, if the user and a contact or a group of contact has mutually agreed on an activity, say 'eating out', the interaction generation module 214 may generate a list of nearby restaurants. Further, in an example, the filtering module 104 may also generate additional tips and suggestions. For example, the filtering module 104 may generate a suggestion to book a restaurant. Further, the filtering module 104 may also generate a review of a place where the user is heading for the activity. In an example, the filtering module 104 may generate a review from analyzing public reviews of that particular place.

Further, the contact generation device 102 may identify dynamic filtering parameters as indicated by the user. The filtering module 104 may filter the first set of contacts, based on the dynamic filtering parameters to generate a second set of selective contacts. The dynamic filtering parameters may either be provided by the user or may be determined by the contact generation device 102. In an example, the user can provide real-time textual or verbal input. The second set of selective contacts is stored in a memory space of the contact generation device 102 for predetermined time. After the lapse of the predetermined period of time, second set of selective contacts are deleted, and the contact generation device 102 triggers a regeneration trigger for generating a new second set of selective contacts.

In an example, the predetermined time may be a day, a week, or as defined by the user. A user, such as the user 110 can access the second set of contact form the memory space of the contact generation device 102 for establishing a communication with any of the contact from the second set of selective contacts. In an example, if the user is not satisfied of the second set of selective contacts, the user may provide his input to regenerate the second set of selective contacts and the filtering module 104 will generate the second set of selective contacts according to the techniques described above. The details of filtering and generating the first set of selective contacts and the second set of selective contacts are explained with reference to FIG. 2.

Figure 2:
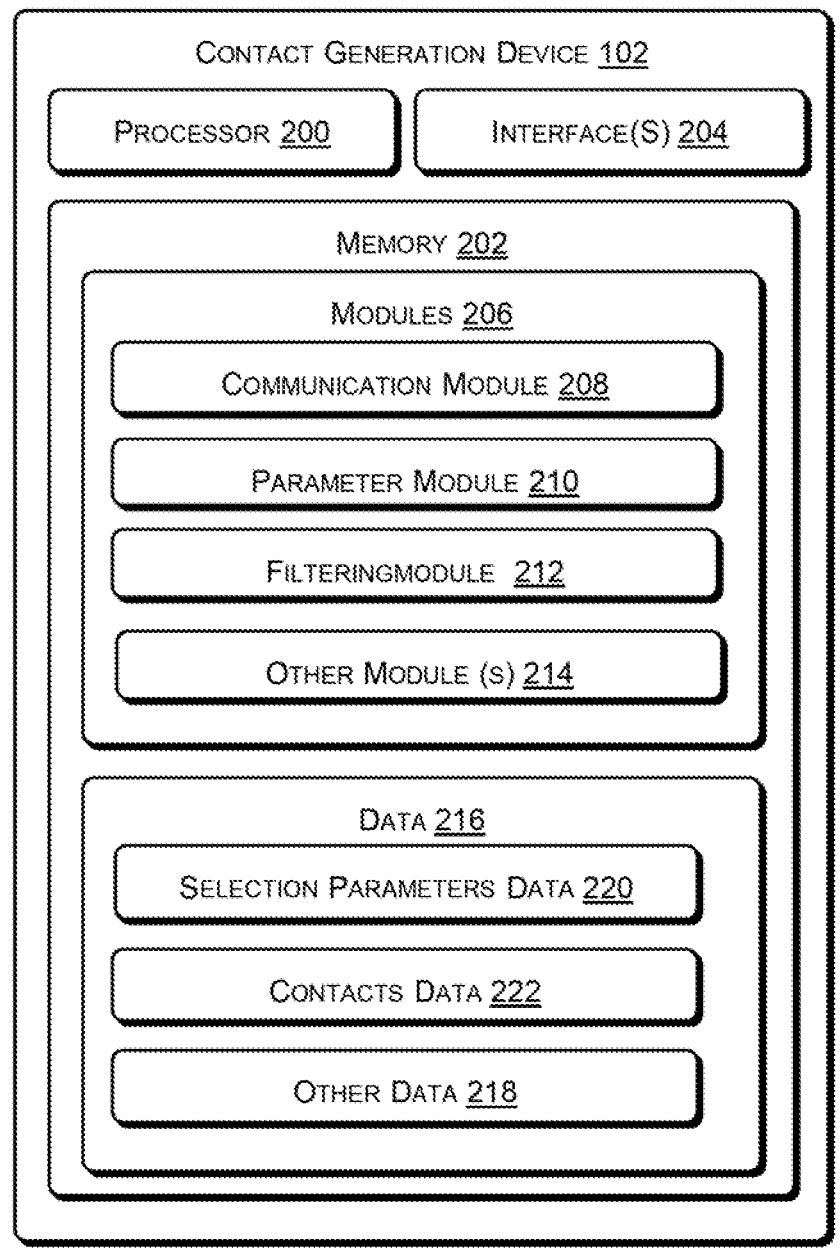
FIG. 2 illustrates a contact generation device, in accordance with an example implementation of the present subject matter.

FIG. 2 illustrates the contact generation device 102, in accordance with an example implementation of the present subject matter.

The contact generation device 102, among other things, includes processor(s) 200 and memory 202 and interface(s) 204 coupled to the processor(s) 200. The processor(s) 200 may be implemented as microprocessors, microcomputers, microcontrollers, digital signal processors, central processing units, state machines, logic circuitries, and/or any devices that manipulate signals based on operational instructions. Among other capabilities, the processor(s) 200 is configured to fetch and execute computer-readable instructions stored in the memory 202 of the contact generation device 102. The memory 202 may include any computer-readable medium including, for example, volatile memory (e.g., RAM), and/or non-volatile memory (e.g., EPROM, flash memory, etc.).

The functions of the various elements shown in the Figures, including any functional blocks labelled as "processor(s)", may be provided through the use of dedicated hardware as well as hardware capable of executing software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included. The processor(s) 200 is responsible managing the operations of the contact generation device 102.

The interface(s) 204 may include a variety of software and hardware interfaces, for example, interface for connected peripheral device(s) such as an external memory. Further, the interface(s) 204 may enable the contact generation device 102 to communicate with other devices. The interface(s) 204 may facilitate multiple communications within a wide variety of protocols and networks, such as the network 108, including wired networks, e.g., LAN, cable, etc., and wireless networks, e.g., WLAN, cellular, satellite, etc. The interface 204 may be used to provide inputs to contact generation device 102. The examples of inputs may be, dynamic filtering parameters.

Modules 206 and data 216 may reside in the memory 202. The modules 206 include routines, programs, objects, components, data structures, and the like, which perform particular tasks or implement particular abstract data types. In an example, the modules 206 include a communication module 208, parameter module 210, and a filtering module 212. The modules 206 may also comprise other module (s) 214 that supplement functions of the contact generation device 102.

The data 216 serves, amongst other things, as a repository for storing data that may be fetched, processed, received, or generated by the modules 206. The data 216 comprises other data 218 corresponding to the other modules 210. In the illustrated example implementation, the data 216 of the contact generation device 102 also selection parameters data 220 and contacts data 222.

The communication module 208 may communicate with a database, such as database 106-1 to transmit an address book stored on the contact generation device 102 to the database. The address book comprises list of contact saved by the user of the contact generation device 102. The user may provide the instruction, for transmission of the address book to the database, via the interface(s) 204. In another example, the address may be automatically transmitted to the database after a regular interval of time. After, the address book is transmitted to the database, the address book may be deleted from the contact generation device 102. In an example, the contacts may be added from social networking sites, such as Facebook, LinkedIn, twitter to the address book.

While saving a contact in the address book of the contact generation device 102, the user may specify attributes for a contact. For example, the user may specify, during saving of the contact, say 'A', that the contact 'A' is family member of the user. The attributes may be specified by selecting an appropriate attribute during saving of the contact. For example, during saving of the contact 'A' the user may provide the keyword 'family' in the relation field of the contact 'A'. Thus, accordingly various attributes may be defined for the plurality of contacts in the address book. During transmission of the address book, the attributes of the plurality of the contacts are also transmitted to the database.

Further, in an example, the attributes for the plurality of the contacts may be determined by the contact generation device 102 and may be updated against each of the plurality of the contacts in the database. For example, the contact generation device 102 may determine an attribute, such as 'close friend', for a contact, by analyzing a social media account of the user. The determined attribute of a contact may be then transmitted by the communication module 208 and may be stored in the database against the contact. Thus, a plurality of attributes may be stored against each of the contact wherein the attributes may be defined by the user and determined by the contact generation device 102. The attributes may be used by the filtering module 212 to generate a second set of contacts based on selection parameters as explained in the foregoing description.

In operation, the parameter module 210 may access a plurality of databases, such as databases 106-1, 106-2, . . . , 106-n to determine selection parameters. In an example, the databases 106-1, 160-2, 106-3 may correspond to the databases of Facebook, LinkedIn, twitter, google places etc. The contact generation device 102 may access the databases of the social networking website to determine selection parameters. In an example, the database corresponding to the Facebook, twitter, LinkedIn, google places may be accessed through a GraphQL server. In an example, a collector may be coupled with the databases of the Facebook, twitter, LinkedIn, google places and the all the collectors may in turn be coupled with the GrpahQL server. The contact generation device 102 may communicate over HyperText Transfer Protocol (HTTPS) with a graph QL server to retrieve the details from the databases of the Facebook, twitter, LinkedIn, google places. In an example, the contact generation device 102 may require a permission from the user to access his social account data. For example, a user may be provided a prompt 'collect my data from Facebook' and when the user allows the prompt, the user is directed to the Facebook page where the user authenticates the contact generation device 102 to collected data from Facebook. The contact generation device 102 sends a message to GraphQL server which may in turn initiate a collector of the Facebook to collect data from the Facebook. The collector will collect the data and will provide the data to the GraphQl server and thereafter from the GraphQl server, the contact generation device 102 may access the Facebook data. This has been explained in detail with reference to FIGS. 3 and 4.

As explained earlier, the selection parameters are based on user preferences and system selection criterion. The selection parameters based on user preferences may include parameters provided by the user. The selection parameters based on the system selection criterion may include system selection parameters determined by the parameter module 210.

In an example, the user selection parameters may be, such as intensity relation of the user with a contact, meeting schedule of the user, travel plans of the user, appointments of the users, tour and travel plans of the user etc. In an example, the user selection parameters may be provided by the user. For example, a user may provide a text-based input or a voice-based input.

Further, in another example, the parameter module 210 may determine the selection parameters. For example, the parameter module 210 may determine the selection parameters based on the social activity of the user on different social media web platform. In another example, the parameter module 210 may determine the physiological conditions, sociological conditions, environmental conditions, and physical conditions of the user to determine selection parameters. For example, if the social media activity of the user indicates that the user is an introvert, the parameter module may determine the selection parameters to be 'introvert'. This will help in generating contacts with similar phycological condition. Similarly, the selection parameters may be determined based on the sociological conditions of the user. For example, if the user is a retired person, the selection parameter may be determined to be 'retired' or 'free' or 'no working hours'. This will help in generating contacts with similar sociological conditions. The selection parameters, as defined by the user or determined by parameter module 210, are then collated by the filtering module 212 and are stored in selection parameters data 220.

In an example, the filtering module 212 may define the priority and weightage of each of the selection parameters based on which aggregate weight (numerical) is allotted to each of the contacts. For example, it may be defined that the selection parameter 'intensity of relation' has first priority and the selection parameter 'location' has the second priority, then accordingly weights 1 and 0.5 may be allotted to these selection parameters respectively. For generating a first list of selective contacts, the filtering module 212 may access the database storing the contacts of the user and may compare the selection parameters with the attributes of the contacts to provide the aggregate weight to each of the contact, wherein the aggregate weight is evaluated based on the weightage defined for the selection parameter corresponding to that contact.

For example, if it is determined by the parameter module 210 that the user has his birthday today, then the device may determine the selection parameters based on the occasion 'birthday of the user'. On birthday, the user would want to talk to his family first, secondly his friends and lastly with his colleagues. Thus, 'family', 'friends', and 'colleagues' may be determined as selection parameters by the device. Moreover, the user may wish to meet his family members and friends who reside nearby the location of the user, on his birthday, the "location of the user and his contacts' may be chosen as one of the selection parameters. Thus, filtering module 212 may access the database and may compare these selection parameters with the attributes of the contacts stored in the database. The filtering module 212 may thereafter provide the aggregate weight to each of the contact. For example, as given in Table 1, if the priority of selection parameter 'family' is first, second priority is assigned to 'friends', third priority is assigned to 'location' and fourth priority is assigned to 'colleagues', then the weights are assigned to these selection parameters accordingly. Thereafter, the filtering module 212 may evaluate aggregate weight associated to each of the contacts. The filtering module 212 may generate a first list of selective contacts based on the aggregate weights of the contacts. For example, filtering module 212 may generate a list of ten contacts arranged in descending order of their aggregate weights.

TABLE 1

| S. no. | Selection Parameter | Priority | Weight |
|---|---|---|---|
| 1. | Family | $1^{st}$ | 1 |
| 2. | Friends | $2^{nd}$ | 0.75 |
| 3. | Location | $3^{rd}$ | 0.5 |
| 4. | Colleagues | $4^{th}$ | 0.25 |

In another example, if the parameter module 210 indicates that the user has a meeting scheduled at 1100 hours, one of the selection parameters may be determined as 'colleagues. Moreover, another selection parameter may be determined as 'location'. In this case, the priority of the selection parameter 'colleagues' may be first and the priority of the selection parameter 'location' may be second. Also, the 'frequency of contact' may be determined as a selection parameter, as it may assist in determining which colleague is called more frequently. As given in Table 2, weights to these selection parameters may be assigned according to their priority. The filtering module 212 may thereafter allot aggregate weight to each of the contacts based on the weightage of selection parameters and may generate a first list of selective contacts as explained above.

TABLE 2

| S. no. | Selection Parameter | Priority | Weightage |
|---|---|---|---|
| 1. | Colleagues | $1^{st}$ | 1 |
| 2. | Location | $2^{nd}$ | 0.75 |
| 3. | Frequency of contact | $3^{rd}$ | 0.5 |

In another example, the parameter module 210 may analyze the post of the user on various social media websites and based on the posts, may determine the physiological parameters for the user. The filtering module 212 may thereafter generate a list of contacts based on the user's physiological parameters.

In another example, the filtering module 212 may generate a list of contacts based on the user's preference, such as sex of the contacts, distance, geolocation etc.

After the first list of selective contact is generated, the contact generation device 102 may prompt the user to provide dynamic filtering parameters. For example, the user may require changing the weightage of the selective parameters, such as either to increase or decrease the weightage of the selection parameters. The filtering module 212 may thereafter allot the values to each of the contacts based on the new weightages and may generate the second list of selective contacts based on the total allotted values. The second list of selective contacts is stored on a storage of the contact generation device 102, such as in the contacts data 222. The second list of selective contacts may be stored for a predetermined period of time. After, the lapse of the predetermined period of time, the filtering module 212 may again generate a second list of selective contacts by the techniques recited above.

In an example, if the user wishes to re-generate the second list of the selective contacts, (s)he may trigger a regeneration request and the filtering module 212 may again generate a third list of selective contacts based on the process as explained below.

When a list of contact is generated, the filtering module 212 may also recommend an activity for the each of the contact based on the interests and hobbies of the contacts. In an example, if a list of contacts is generated having contacts, A, B, and C and the contact A is determined to be interested in shopping, an activity 'shopping' may be displayed for the contact A and the user can suggest the contact A to involve in shopping. Further, an activity may also be recommended for the contact B and C based on the details of the contact B and C.

In an example, the user may create a group of contacts having a plurality of contacts. In an example, the user may create a group of contacts having similar interests, similar hobby etc. In an example, the user can also search the group of contact for a particular contact. The user may add or remove the contacts from the group to modify the group size.

Figure 3:
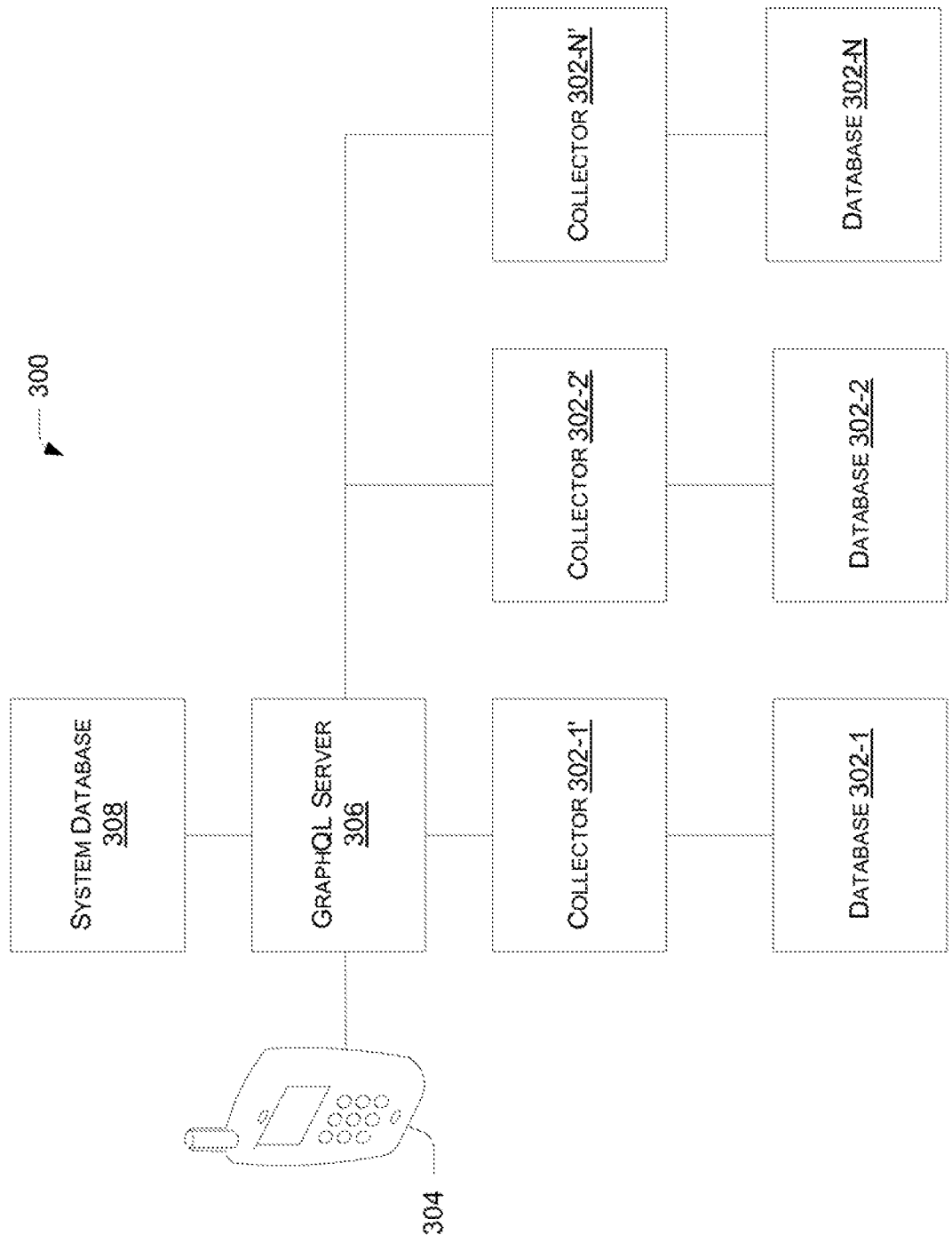
FIG. 3 illustrates an architecture for a system which retrieves data form databases, according to an example of the present subject matter.

FIG. 3 describes an architecture 300 for a system for retrieving data, such as selection parameters from databases, such as databases of social media accounts of the user. As explained earlier, the contact generation device 102 may access the databases of the social networking website to determine selection parameters. FIG. 3 shows a database 302-1, a database 302-2, . . . , a database 302-N coupled to a contact generation device 304 via a graphQL server 306. In an example, a collector 302-1', a collector 302-2', and a collector 302-N' may be coupled with each of the database 302-1, the database 302-2, and database 302-N, respectively. The collector 302-1', the collector 302-2', and the collector 302-N' may be also coupled with the graphQL server 306. The contact generation device 102 may communicate over HTTPS with the graphQL server 306 to retrieve the details from the database 302-1, the database 302-2, and the database 302-N. In an example, the database 302-1, the database 302-2, and the database 302-N may correspond to the databases of social media accounts of user, such as Facebook, LinkedIn, google places, twitter etc. In an example, the contact generation device 304 may require a permission from a user to access his social account data. For example, a user may be provided a prompt 'collect my data from Twitter' and when the user allows the prompt, the user is directed to the Twitter page where the user authenticates the contact generation device 304 to collect data from Twitter. In an example, consider that the database 302-1 corresponds to Twitter. The contact generation device 304 sends a message to GraphQL server 306 which may in turn initiate the collector 302-1' of the database 302-1 to collect data from the database 302-1. In an example, the graphQL server 306 may send a message indication the data that is required. In an example, the message may comprise keywords, like 'contacts of last ten video calls', 'contacts of last ten chat conversations' etc. The collector 302-1' will collect the data and will provide the data to the GraphQL server 306 and the graphQL server 306 may store the data in a system database 308. Similarly, data from all the other databases are collected and stored in the system database 308. The graphQL server 306 may provide the required data, such as selection parameters to the contact generation device 304, when required. In an example, the database 302-1, 302-3, . . . , 302-N may be implemented on mongoDB and the graphQL server 306 may utilize mongoDb protocol for communication with the collector 302-1', 302-2', . . . , 302-N'. In an example, apache spark may be employed to manage clusters of computing systems and clusters of databases.

In an example, the data in the system database 308 may be stored in an encrypted form. The encryption of the data may be done using NTRU algorithm. Due to strong protection mechanism, such as the NTRU algorithm, it is very difficult for a malicious user to access sensitive personal data. Thus, changes of privacy breach are very minimal in the current system as compared to the conventional system.

Figure 4:
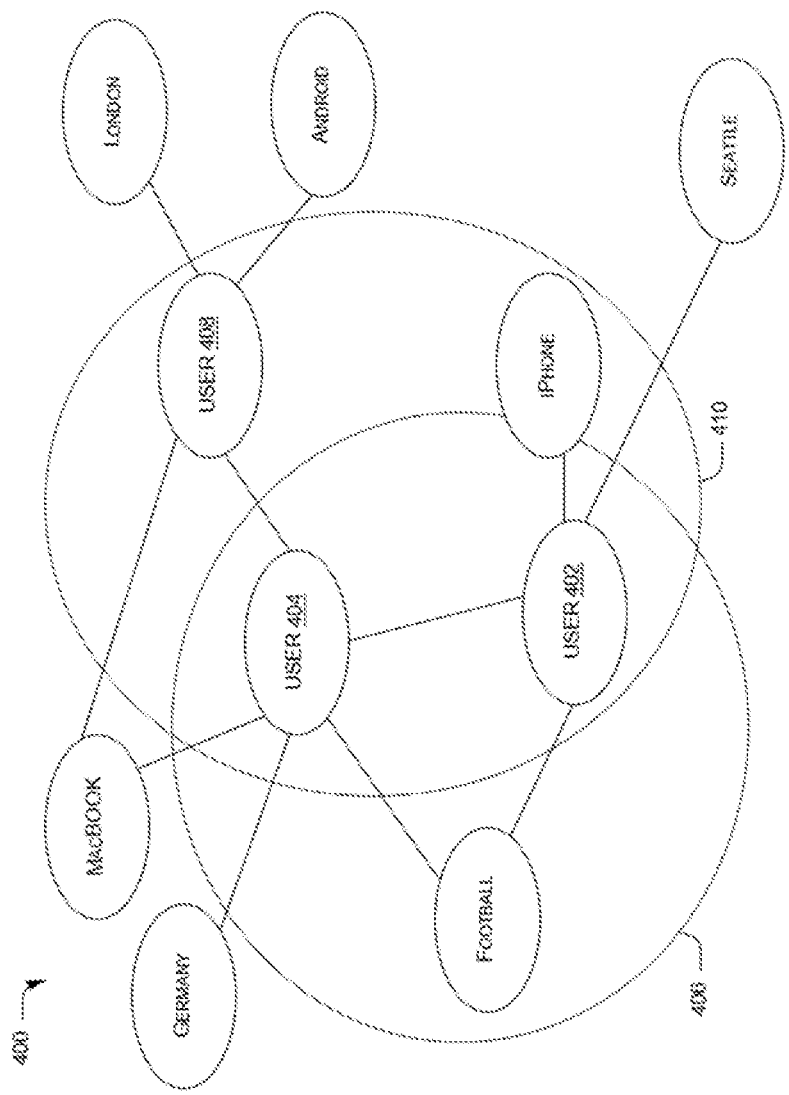
FIG. 4 shows a graph form of a stored data according to an example of the present subject matter.

Further, in an example, the data may be stored in the system database 308 in a graph form 400 as shown in FIG. 4. In an example, in the graph form 400, data of a user 402 is linked with each other for better analysis and utilization of the data. For example, for the user 402 if it is determined that the user is interested in football and further it is determined that another user 404, which is a contact in the address book of the user, is also interested in football, a connection 406 is created for the user 402. In another example, a user 408 knows the user 404 but do not knows the user 402 and an indirect connection 410 is created between the user 402 and the user 408. In an example, a location of the user 402, the user 404, and the user 408 and a computing device the user 402, user 404, and the user 408 uses is also reflected on the graph form 400. For example, in the figure, the user 402 is known to use an iPhone and is located in Seattle. Similarly, the user 404 uses a MacBook and is located in Germany. Further, the user 408 also uses a MacBook and an android phone but is located in London. Thus, a graph form 400 of each of the user may be created. The graph form 400 is easier to analyze and is faster for retrieving results. In a graph form, such as the graph form 400, a single query may by be run to derive results. Thus, such graph forms are faster than standardized query language (SQL) and other conventional methods.

Figure 5:
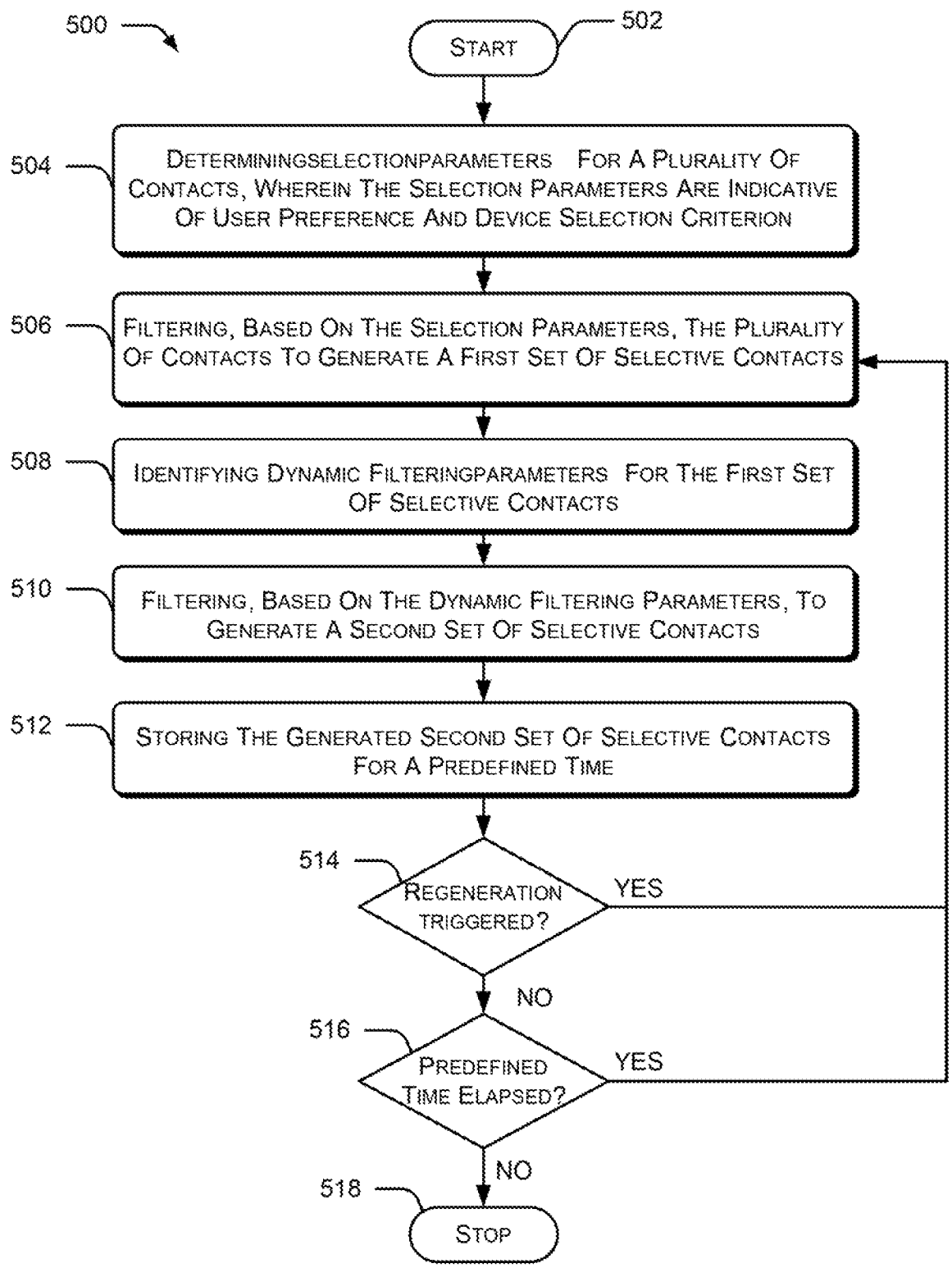
FIG. 5 illustrates a method for generating a second set of selective contacts, according to an example of the present subject matter.

FIG. 5 illustrates a method 500 for determining, generating a second list of selective contacts, in accordance with an example of the present subject matter. Although the method 500 may be implemented in a variety of contact generation device, for the ease of explanation, the present description of the example method 500 to generate the second list of selective contacts is provided in reference to the above-described contact generation device 102.

The order in which the method 500 is described is not intended to be construed as a limitation, and any number of the described method blocks may be combined in any order to implement the method 500, or an alternative method.

The method starts at block 502 and proceeds to block 504. At block 504, the selection parameters such as system selection parameter, user selection parameters etc. are determined for a plurality of contacts stored in a relational database. The system selection parameter comprises details, such time of the day, geographical location of the user, weather conditions etc. While the user selection parameters may include factors like, a profile of the user, intensity of the relationship with a contact, the system selection parameters are determined by a parameter module, such as parameter module 210, as explained previously.

At block 506, the plurality of contacts is filtered, based on the selection parameters, to generate a first set of selective contacts. In an example, the selection parameters may include user selection parameters and system selection parameters. The user selection parameters may include details, relation of user with a contact, schedule of user, appointments of user, etc. The system selection parameters are determined by the contact generation device 102. The system selection parameters may comprise details, such as frequency of calling a contact, category of the contact, time of the day, outside weather, location of the user.

At block 508 dynamic filtering parameters are identified, wherein the dynamic filtering parameters are defined by the user or are based in the user's choices. The method then proceeds to block 510. At block 510, the first set of selective contacts is further filtered, based on the dynamic filtering parameters to generate a second set of selective contacts. At block 512, the second set of selective parameters is stored on a storage space of the contact generation device for a predetermined period of time. Thereafter, the method proceeds to decision block 514.

At block 514, it is determined if a user has triggered a regeneration request. If the determination made at block 514 is affirmative, the method proceeds to 506. While if the determination made at block 514 not affirmative, the method proceeds at block 516. At block 516, it is determined if the predetermined time period has expired. If the determination made at block 516 is affirmative, the method proceeds to block 506 while if the determination made at block 516 not affirmative, the method proceeds at block 518 and the process terminates.

Figure 6:
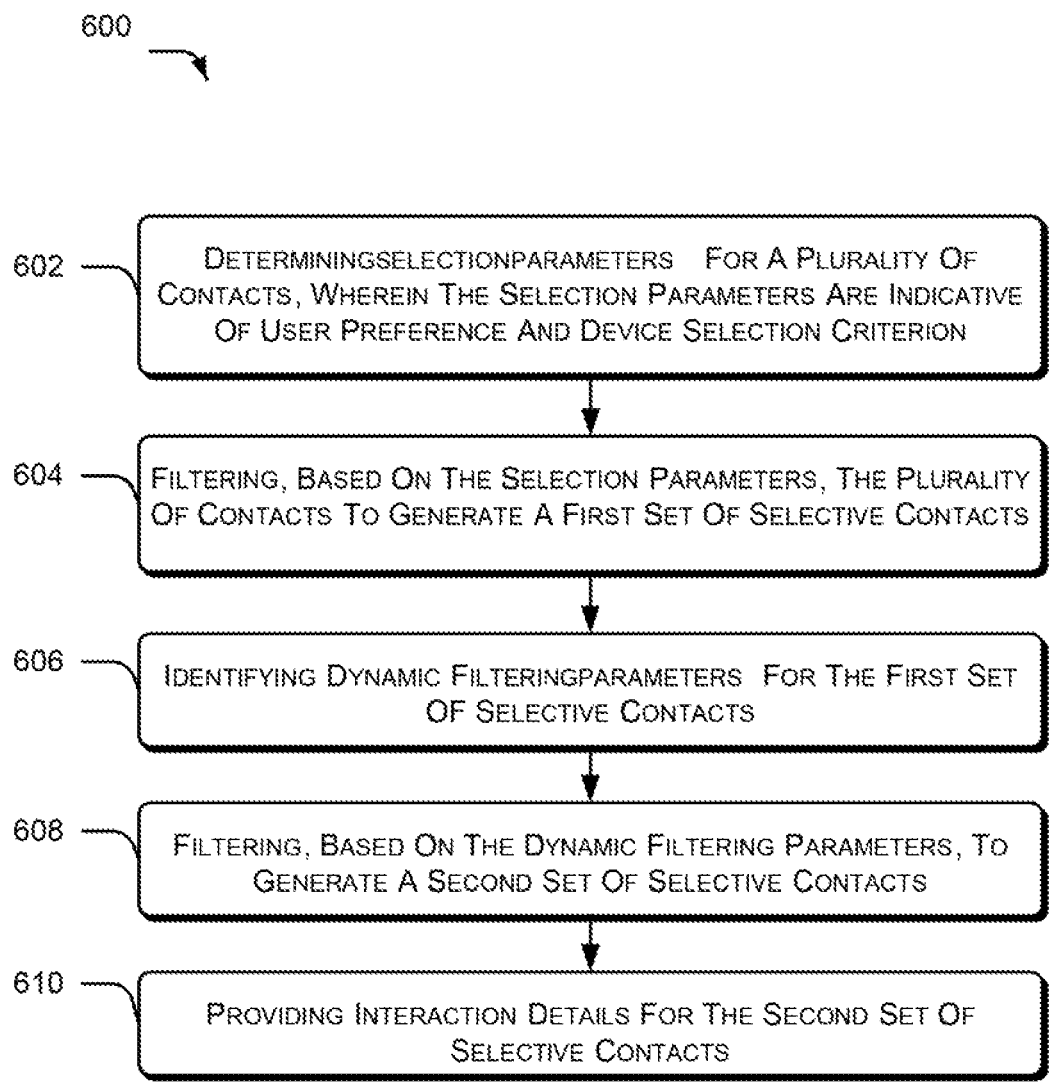
FIG. 6 illustrates a method for generating a second set of selective contacts, according to another example of the present subject matter.

FIG. 6 illustrates a method 600 for determining, generating a second list of selective contacts, in accordance with another example of the present subject matter. Although the method 600 may be implemented in a variety of contact generation device, for the ease of explanation, the present description of the example method 600 to generate the second list of selective contacts is provided in reference to the above-described contact generation device 102.

The order in which the method 600 is described is not intended to be construed as a limitation, and any number of the described method blocks may be combined in any order to implement the method 600, or an alternative method.

According to the method 600, block 602-608 is similar to the block 504-510 of the method 500 and at block 608, a second set of selective contacts is generated. At block 610, interaction details for the second set of selective contacts are generated. The interaction details comprise details, such as list of communication platform to be used for communication with the second set of selective contacts. The interaction details may also comprise a list of suggested activity for each of the contact in the second set of selective contacts. Furthermore, the interaction details may also comprise details, such as list of places where a user can propose the contacts to meet.

Thus, the methods and devices of the present subject matter provide techniques to generate a second set of selective contacts Although examples of generating the second set of selective contacts as described, have been described in a language, specific to structural features and/or methods, it is to be understood that the appended claims are not necessarily limited to the specific features or methods described. Rather, the specific features and methods are disclosed as example for generating the second set of selective contacts.

The invention claimed is:

1. A method comprising:
    storing an address book on a relational database to free memory space of a device, wherein the address book comprises a plurality of contacts of a user;
    determining selection parameters for evaluation of a plurality of contacts, wherein the selection parameters are indicative of user preferences and system selection criterion;
    filtering the plurality of contacts based on the selection parameters to generate a first set of selective contacts;
    identifying dynamic filtering parameters corresponding to the first set of selective contacts, wherein the dynamic filtering parameters are indicative of dynamic user choices; and
    filtering the first set of selective contacts based on the dynamic filtering parameters to generate a second set of selective contacts, wherein the second set of selective contacts are stored in the memory space of the device, and wherein the second set of selective contacts are available to the user for utilization for a predetermined time period.

2. The method as claimed in claim 1, wherein the selection parameters include at least user selection parameters and system selection parameters.

3. The method as claimed in claim 2, wherein the user selection parameters comprises at least one of intensity of relation with a contact, schedule of the user including users' tours and travel plans, meeting schedule of the user, and appointments of the user.

4. The method as claimed in claim 2, wherein the system selection parameters comprise at least one of frequency of calling a contact, category of the contact, time of the day, outside weather, location of the user.

5. The method as claimed in claim 1, wherein the method further comprises regenerating a third set of selective contacts based on a regeneration trigger, wherein the regeneration trigger is one of user initiated and device initiated.

6. The method as claimed in claim 5, wherein the third set of selective contacts is generated based on device initiated regeneration trigger after lapse of the predetermined time period.

7. The method as claimed in claim 1, wherein determining the selection parameters comprises obtaining user input corresponding to a user selection parameters, wherein the user inputs is one of predefined user input and real-time user input.

8. The method as claimed in claim 1, wherein the selection parameters are based on physiological condition, sociological condition, environmental condition, and physical conditions of the user.

9. The method as claimed in claim 7, wherein the real-time user input is one of a textual input and a verbal input.

10. A contact generation device comprising:
    a communication module to transmit an address book to a relational database to free memory space of the device, wherein the address book comprises a plurality of contacts of a user;
    a parameter module to determine selection parameters for evaluation of a plurality of contacts, wherein the selection parameters are indicative of user preferences and device selection criterion;

a filtering module to filter the plurality of contacts based on the selection parameters to generate a first set of selective contacts;

wherein the parameter module is to identify dynamic filtering parameters corresponding to the first set of selective contacts, wherein the dynamic filtering parameters are indicative of dynamic user choices; and wherein the filtering module is to filter the first set of selective contacts based on the dynamic filtering parameters to generate a second set of selective contacts, wherein the second set of selective contacts are stored in the memory space of the device, and wherein the second set of selective contacts are available to the user for utilization for a predetermined time period.

11. The contact generation device as claimed in claim 10, wherein the selection parameters include user selection parameters and system selection parameters.

12. The contact generation device as claimed in claim 10, wherein the user selection parameters comprises at least one of intensity of relation with a contact, schedule of the user including users' tours and travel plans, meeting schedule of the user, and appointments of the user.

13. The system as claimed in claim 11, wherein the system selection parameters comprise at least one of frequency of calling a contact, category of the contact, time of the day, outside weather, location of the user.

14. The contact generation device as claimed in claim 10, wherein the filtering module is to regenerate a third set of selective contacts based on a regeneration trigger, wherein the regeneration trigger is one of user initiated and device initiated.

15. The contact generation device as claimed in claim 14, wherein the third set of selective contacts is generated based on device initiated regeneration trigger after lapse of the predetermined time period.

16. The contact generation device as claimed in claim 10, wherein determining the selection parameters comprises obtaining user input corresponding to the user selection parameters, wherein the user inputs is one of predefined user input and real-time user input.

17. The contact generation device as claimed in claim 10, wherein determining the selection parameters comprises analyzing physiological condition, sociological condition, environmental condition, and physical conditions of the user.

* * * * *